United States Patent [19]

Barnes

[11] 4,333,070
[45] Jun. 1, 1982

[54] MOTOR VEHICLE FUEL-WASTE INDICATOR

[76] Inventor: Robert W. Barnes, 108 Deep Dale Dr. East, Levittown, Pa. 19056

[21] Appl. No.: 231,966

[22] Filed: Feb. 6, 1981

[51] Int. Cl.³ .............................................. G08B 21/00
[52] U.S. Cl. .............................. 340/52 R; 340/52 D; 340/407; 340/669; 200/83 N; 200/86.5
[58] Field of Search .................... 340/52 R, 52 D, 53, 340/62, 669, 407; 200/61.44, 83 D, 83 N, 86.5

[56] References Cited
U.S. PATENT DOCUMENTS 2,128,250  8/1938  Howard et al. ................. 340/52 R
3,911,393  10/1975  Biggs ................................. 340/669

*Primary Examiner*—Alvin H. Waring
*Attorney, Agent, or Firm*—Florence U. Reynolds

[57] ABSTRACT

A method and electro-mechanical device, for use on motor vehicles, which signals the driver to ease up on the gas pedal whenever he is applying excessive pedal pressure which causes fuel waste. The device utilizes a vacuum-operated electric switch that detects any drop in engine intake-manifold-vacuum below a pre-selected level, caused by excess foot-pressure on the gas pedal, and applies voltage to an electric vibrator which is coupled to the gas pedal. On feeling the gas pedal vibrating, the driver reduces his pedal pressure sufficiently to allow engine vacuum to rise above the pre-selected level, thereby causing the vacuum-switch to cut off electric current to the pedal vibrator. This cessation of vibration serves as a feed-back signal to the driver that his pedal pressure, and hence vehicle performance, is restored to an economical level.

8 Claims, 6 Drawing Figures

MOTOR VEHICLE FUEL-WASTE INDICATOR

BACKGROUND OF THE INVENTION

This invention relates to a method and to an electro-mechanical device to be utilized on motor vehicles for the purpose of reducing fuel-waste caused by improper driving habits. Such vehicles can be, but are not limited to: passenger cars; buses; taxis; trucks; and the like.

Most motor vehicles are powered by internal combustion engines that have a multiple of power cylinders. In typical engine operation, vacuum pulses are produced in each cylinder during the intake strokes of each cylinder's piston. These individual pulses are coupled through cylinder intake-valve ports to a common manifold, where they merge and accumulate as a common vacuum termed in the trade and herein as "manifold-vacuum". This vacuum draws both combustion air and fuel through the carburetor and into the intake manifold as a mixture, to be drawn upon by each cylinder in turn during that cylinder's intake-vacuum-pulse, except in fuel injected engines where manifold-vacuum is used to draw in combustion air only.

It is well known in the automotive field that manifold-vacuum, as measured at the intake manifold, varies in direct relation to the efficiency of both engine and driving techniques, and can be interpreted as a relative indicator of vehicle gas mileage. That is, the higher the manifold-vacuum that is maintained while driving, the higher the average gas mileage that can be expected.

Manifold-vacuum, along with vehicle fuel economy, will drop in relation to the degree of loading on the vehicle and its engine produced by wind resistance, speed, degree of incline, head winds, rate of acceleration, added weight, and improper engine operating temperature.

Since drivers are unable to accurately or constantly correlate the combined effects of varying vehicle and engine loads, they tend to develop the fuel-wasting habit of driving with an unnecessarily "heavy foot on the gas pedal". A driver who could monitor manifold-vacuum while operating his vehicle could correct his driving techniques (i.e., speed, rate of acceleration, etc.) so as to maintain a higher manifold-vacuum, and obtain an improvement in gas mileage.

Existing methods of monitoring manifold-vacuum have been limited to devices that produce audible or visual signals that relate to the amount or variation of that vacuum. These devices use flashing lights, audible buzzers or beepers, or a vacuum-operated analog gauge or digital read-out to signal the driver to ease up on the gas pedal or make other adjustments in vehicle operation. The signaling parts of these devices are generally installed within close proximity of the driver.

The major disadvantage of prior methods and devices is that an excessive "reaction-loop" of sensing-and-responding is required of the driver that is not easy or automatic. The signals have to be received by the eyes or ears of the driver, interpreted by the brain, and passed on to the driver's foot. When the lights, buzzer, or beeper stops, or the vacuum reading changes, the brain must again interpret and send a conditioning signal to the foot. The driver's brain is usually preoccupied with other interpretative and decision-making acts, and would probably react to fluctuating audible or visual signals with confusion, inaction, or general annoyance. Marginal or inexperienced drivers would find such devices to be a distraction that requires undo effort and thought.

Devices that utilize buzzing or beeping sounds as a means of signaling the driver could be rendered ineffective in the presence of high noise levels in or outside the vehicle.

Devices that rely on reading a vacuum gauge or digital read-out require that the driver constantly alternate his attention from watching the road to watching the gauge or read-out to appreciate the benefits of the device. This diversion of concentration could prove to be hazardous to the average driver.

Devices that use flashing lights as a means of signaling the driver require that the lights be mounted or visually presented within the cone of vision of the driver. Changes in the direction a driver may be looking could reduce or negate the effectiveness of such signal. Also, visual signals are subject to interference from high ambient lighting, such as exists when driving in to the sun.

The existing methods and devices mentioned would present a high degree of distraction and annoyance not only to the driver, but to other passengers that may occupy the vehicle.

SUMMARY OF INVENTION

The invention relates to a method and device for monitoring motor vehicle manifold-vacuum, as measured at the intake manifold, and means of signaling the driver when manifold-vacuum is below a pre-selected level.

When the vehicle is operated under conditions which produce a manifold-vacuum that is below the pre-selected level, an electro-mechanical vibrator is electrically actuated and produces a vibration that is mechanically transmitted to the gas pedal under the driver's foot. As the driver eases up on the gas pedal, manifold-vacuum will rise above the preselected level and cause a disconnect of electric current to the vibrator.

If the vehicle is operated so as to maintain manifold-vacuum above the pre-selected level, or if vehicle battery voltage is disconnected from the circuit of the invention, no voltage is applied to the vibrator.

A suitable device for carrying out the method of the invention comprises: an electro-mechanical vibrator that will produce a mechanical vibration at the gas pedal when electrically powered by vehicle battery voltage; and a sensing assembly, comprising a vacuum-operator and an electric switch arrangement, that makes-or-breaks the battery voltage circuit to the vibrator at a pre-selected level of engine manifold-vacuum.

Features of the invention that overcome the disadvantages of prior devices as described herein, are:

(a) The invention induces a vibration at the gas pedal as a means of signaling the driver to ease up on the gas pedal. This provides an improved and smaller "reaction-loop" of sensing-and-responding for the driver, in that the loop is essentially confined to the sole of the driver's foot. His foot simply reacts to the pedal vibration, and withdraws pressure as necessary to stop the vibration. This cessation of vibration serves as a feedback signal to the driver that his pedal pressure, and hence vehicle performance, is restored to an economical level. Even an inexperienced or marginal driver can be expected to adapt to the device easily and automatically.

(b) The vibration produced under the driver's foot is relatively mild and inaudible, and would not annoy passengers as would devices that use flashing lights, buzzers, or beepers.

(c) The invention performs its intended function unaffected by high background noises or changes in ambient lighting, and regardless of where the driver may be looking.

DETAILED DESCRIPTION OF DRAWINGS

The drawings designated FIG. 1 through FIG. 6 illustrate specific embodiments of the invention.

Figure 1:
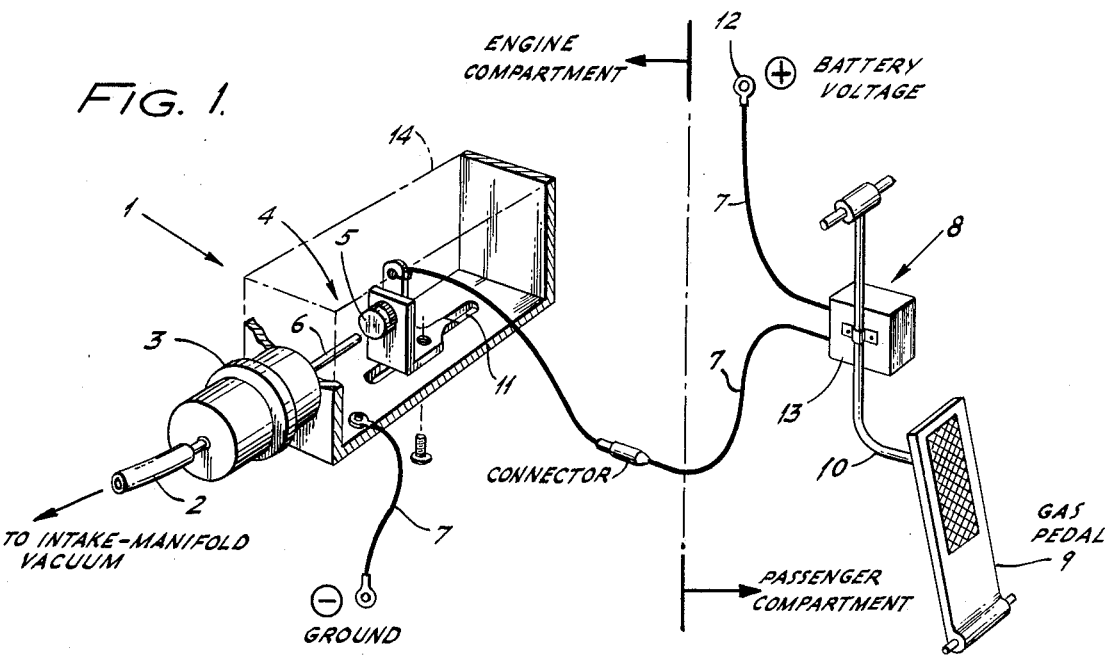
FIG. 1 is a functional illustration showing the primary elements and electro-mechanical interconnections of the invention on a typical motor vehicle.

FIG. 1 illustrates the primary elements configured and interconnected for operation on a typical motor vehicle. When the vehicle engine is operating, vacuum from the engine intake-manifold is coupled to the sensing assembly 1 through the vacuum hose 2 and causes the vacuum operator 3 to operate the electric switch arrangement 4, that consists of the first contact 5 and the movable second contact 6 displaced in position by the operation of vacuum operator 3, as a switching means to make-or-break the electric circuit that applies vehicle battery voltage through insulated wire 7 to the electro-mechanical vibrator 8 which is mechanically coupled to the gas pedal 9 through the pedal linkage assembly 10. Contact 6 is electrically connected through the conductive metallic structure of vacuum operator 3 to vehicle battery voltage. Provisions for changing the position of contact 6 along the adjusting slot 11 provides a means of setting the switch arrangement 4 to operate at any one pre-selected level of manifold-vacuum. Wiring lugs 12 are connected to appropriate terminal points on the vehicle that provide the source of vehicle battery voltage. Vibrator 8 is encased in an impact and dust resistant enclosure 13, and sensing assembly 1 is similarly protected by enclosure 14. Wire 7 between sensing assembly 1 and vibrator 8 is shown with a conventional electrical connector which may be utilized to facilitate the routing of wiring through the fire wall between engine and passenger compartments.

Figure 2:
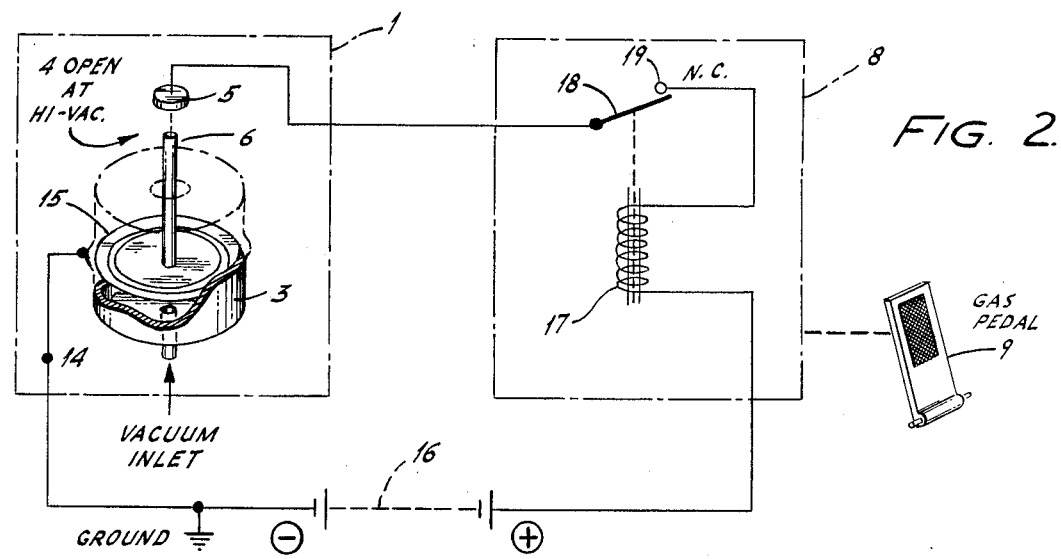
FIG. 2 is an electro-mechanical schematic of the invention shown in FIG. 1.

FIG. 2 illustrates the electro-mechanical circuit operation of FIG. 1 in an embodiment that utilizes a vacuum-operated diaphragm means for the operation of vacuum operator 4, and a basic electric-relay configured means for the operation of vibrator 8. Displacement of the movable portion of the internal diaphragm 15 of vacuum operator 3 to a position produced when manifold-vacuum is below a pre-selected level causes contact 6 to engage contact 5, thereby connecting the voltage from the vehicle battery 16 to vibrator 8. When the voltage is applied to vibrator 8, current flow through the coil 17 produces an electro-magnetic force that draws the electrically conductive spring-return armature 18 away from its normally-closed connection with the contact 19, causing a break in current flow to coil 17 and allowing armature 18 to be spring-returned to a position that re-engages it with contact 19. This cycle repeats itself as long as the voltage is applied, and results in an oscillating action of armature 18 that produces a mechanical vibration in the structure of vibrator 8 that is physically transmitted to the gas pedal 9. Vacuum operator 3 with internal diaphragm 15, and vibrator 8 comprising coil 17, armature 18, and contact 19, are of a design consistent with techniques well-known in the art.

Figure 3:
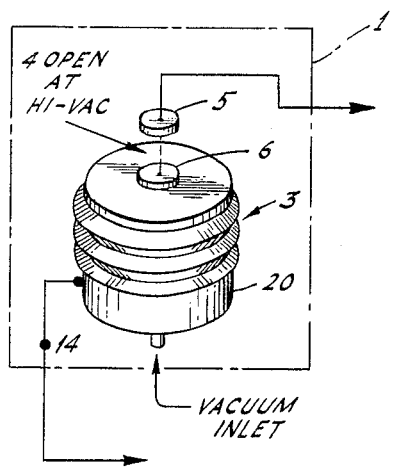
FIG. 3 is an electro-mechanical schematic showing a vacuum-operated bellows as an alternative vacuum operator in the sensing assembly of FIG. 2.

FIG. 3 illustrates a first alternative substitution for diaphragm 15 that forms the operating element of vacuum operator 3 of FIG. 2; the substitute being the vacuum-operated bellows 20 which has one surface that is displaced in direct relation to the applied manifold-vacuum, and that movable surface being electrically conductive and forming the contact 6 that engages contact 5 when the manifold-vacuum applied to bellows 20 is below a pre-selected level. Contact 6 is electrically connected to vehicle battery voltage through the conductive metallic structure of bellows 20 which forms the vacuum operator 3 of FIG. 2 without need for an outer case or enclosure. Bellows 20 is of a conventional design well-known in the art.

Figure 4:
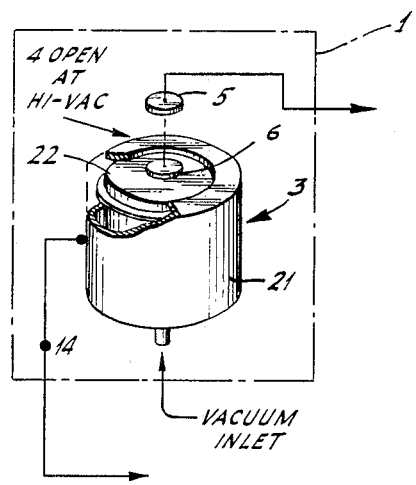
FIG. 4 is an electro-mechanical schematic showing a vacuum-operated piston as an alternative vacuum operator in the sensing assembly of FIG. 2.

FIG. 4 illustrates a second alternative substitution for diaphragm 15 that forms the operating element of vacuum operator 3 of FIG. 2; the substitute being a combination of the outer cylinder shell 21 with a conventional spring-return internal piston 22 that is displaced by, and in direct relation to, the applied manifold-vacuum and is electrically conductive with the end-surface opposite the applied vacuum forming the contact 6 that engages contact 5 when the manifold-vacuum applied to cylinder shell 21 is below a pre-selected level. Contact 6 is electrically connected to vehicle battery voltage through the conductive metallic structure of piston 22 and the shell 21 that forms the outer case of vacuum operator 3 of FIG. 2. Vacuum operator 3 comprising shell 21 and piston 22 is of a conventional design well-known in the art.

Figure 5:
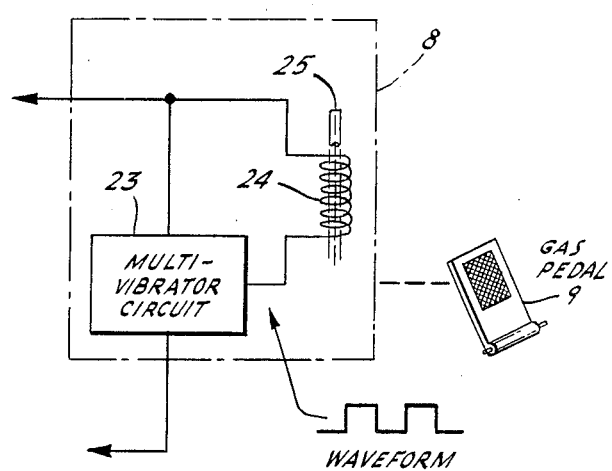
FIG. 5 is an electro-mechanical schematic showing the combination of an electronic multivibrator circuit and electric solenoid as an alternative to the operating elements in the electro-mechanical vibrator of FIG. 2.

FIG. 5 illustrates a first alternative substitution for coil 17, armature 18, and contact 19 that form the operating elements of vibrator 8 of FIG. 2; the substitute being a combination of the electronic multivibrator circuit 23 and the electric solenoid 24 with the spring-retained plunger 25. When vehicle battery voltage is applied to vibrator 8, multivibrator circuit 23 produces an alternating output-voltage that is applied to solenoid 24, generating an alternating electro-magnetic force in solenoid 24 that causes spring-retained plunger 25 to physically move back and forth at the output frequency of multivibrator circuit 23, thereby producing a vibration in the structure of vibrator 8 that is physically transmitted to gas pedal 9. Utilizing established electro-mechanical and solid state electronic designs well-known in the art, multivibrator circuit 23 is of a conventional free-running type, and solenoid 24 with plunger 25 is a conventional solenoid arrangement that operates with spring-retained plunger action. Multivibrator circuit 23 may be substituted with any conventional signal generating circuitry that generates a sine-wave or other wave form output voltage as appropriate to drive solenoid 24 and thereby cause an adequate vibration at gas pedal 9.

Figure 6:
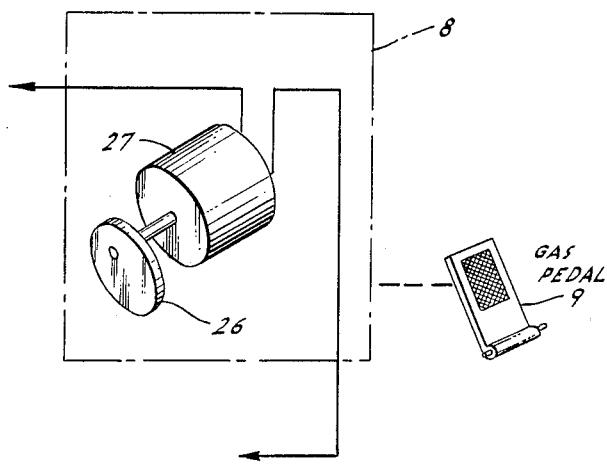
FIG. 6 is an electro-mechanical schematic showing the combination of an electric motor and eccentric weight as an alternative to the operating elements in the electro-mechanical vibrator of FIG. 2.

FIG. 6 illustrates a second substitution for coil 17, armature 18, and contact 19 that form the operating elements of vibrator 8 of FIG. 2; the substitute being a combination of the eccentric member 26 and the electric motor 27. When vehicle battery voltage is applied to vibrator 8, motor 27 rotates its shaft and through mechanical shaft-coupling causes member 26 to rotate. By means of its eccentric shape, member 26 is unbalanced in weight distribution and when rotated will produce a vibration that is shaft-coupled back to motor 27, thereby producing a vibration in the structure of vibrator 8 that is physically transmitted to gas pedal 9. Consistent with design techniques well-known in the art, motor 27 is a conventional DC voltage-driven type, and member 26 is conventionally shaped for an unbalanced weight distribution and may be substituted by any convenient shape or structure having an appropriate unbalance of weight.

FURTHER DETAILS OF THE INVENTION

The following comprise other related or peripheral details of the invention not covered by the descriptions and illustrations of specific embodiments herein.

The primary elements of the invention as shown in FIG. 1 are configured for retro-fit installation on typical motor vehicles. However, the elements may be further mechanically combined or separated in other construction arrangements and in other locations in the vehicle that accomplish the intended function of the invention.

The configuration and point of installation of the electro-mechanical vibrator in FIG. 1 may be changed as appropriate to be capable of inducing a mechanical vibration anywhere along the linkage system coupling the gas pedal to the engine, including attaching the vibrator directly to the gas pedal, as a means to cause a vibration of the gas pedal. Installation hardware for the vibrator may be universal in design to accommodate mechanical variations in pedal linkage systems. The vibrator should be installed in a manner and location that prevents interference with the driver's foot and mechanical obstructions in the vehicle, and maintains proper freedom of movement of the gas pedal linkage system. The wiring to the vibrator also should be dressed to avoid similar interferences.

On a vehicle having a negative-ground electrical system as implied in FIG. 1, the positive battery-voltage wire lug should be connected to a terminal on the vehicle fuse panel that is "live" only after the ignition switch is ON, preventing the vibrator from operating after the engine is shut off. Another alternative arrangement could be to connect the positive wire lug to the fuse panel through a manually operable ON/OFF electric switch accessible to the driver, that allows him to selectively connect or disconnect electric power to the circuit of the present invention.

Electrical circuit polarities and the electro-mechanical design of the primary elements and associated wiring hookup may be changed to accommodate electrical variations in vehicles, such as negative or positive battery grounding system variations.

Connecting a vacuum hose from the sensing assembly of the present invention to the engine intake-manifold can usually be accomplished by cutting the existing manifold-vacuum hose normally connected at the base of the engine carburetor, and inserting a "T" hose-connector that provides a means to couple manifold-vacuum to the sensing assembly. On some vehicles, an existing tapped hole is provided on the intake-manifold to facilitate the installation of add-on devices that require manifold-vacuum in their operation.

The invention is not limited to the examples of embodiments disclosed herein, but is understood to include all variations and modifications, which may be made by those skilled in the art, that fall within the scope or underlying principles of the invention.

MODE OF OPERATION

The present invention, when used on a motor vehicle, enables the driver to easily recognize and improve his driving habits with the intent of achieving improved gas mileage during all driving modes and road conditions. These benefits will be evident to the driver when he encounters: (a) cold starts: (a) where pulling out too vigorously with a cold engine results in a considerable waste of gasoline; (b) wind resistance: where drivers cannot constantly interpret the combined effects of wind resistance, head winds, and rate of speed, as necessary to adjust driving techniques for maximum fuel economy; (c) inclines and hills: where drivers usually waste gas by unconsciously "pushing" their car when climbing steep hills or even mild inclines, whereas the present invention educates the driver to use a lighter gas-pedal effort, or reduce his speed, and still climb the grade comfortably and with minimum fuel waste; and (c) normal acceleration: where the present invention educates the driver to use more moderate rates of acceleration to obtain significant improvements in average gas mileage.

A preferred sequence of operations, using the invention on an average passenger car, is: (a) the driver starts the vehicle engine and applies gas sparingly to minimize or avoid actuation of the gas-pedal vibrator; and in the case where an engine normally starts poorly, the alternative method of electrically disconnecting the device with a manual ON/OFF switch described herein can be used during the engine starting mode; (b) the vehicle operator commences to drive in a normal fashion, and upon feeling a vibration at the gas pedal he would ease up on the gas pedal to a point where pedal vibration ceases; and (c) in a situation where the driver is forced or elects to apply excessive gas-pedal pressure, vibration of the gas-pedal will continue until he eases up on the pedal or manually disconnects the device with the ON/OFF switch or the ignition switch.

I claim:

1. The use of an electro-mechanical vibrator to signal the driver of a motor vehicle, said vehicle having an internal battery, a driver-operated gas pedal, and an internal combustion engine which produces a manifold-vacuum in the intake manifold, as to the state of said vacuum being above or below a pre-selected level, by mechanically coupling said vibrator to the gas pedal under the driver's foot, coupling a sensing assembly to said vacuum, said sensing assembly providing means for connecting a suitable voltage from said battery to said vibrator when said vacuum is below said pre-selected level thereby actuating said vibrator, and for disconnecting said voltage when said vacuum is above said pre-selected level, thereby de-energizing said vibrator.

2. An electro-mechanical device in combination with a motor vehicle having an internal battery, a driver-operated gas pedal, an internal combustion engine which produces a manifold-vacuum in the intake manifold that varies in direct relation to relative engine efficiency and vehicle gas mileage, and access means on said engine to enable coupling of said vacuum to said device, said device comprising (1) an electro-mechanical vibrator which when electrically powered produces a mechanical vibration that is coupled to said gas pedal, causing said gas pedal to vibrate, and (2) a sensing assembly coupled to and actuated by said vacuum and connected to said battery, said assembly including an electrical switch arrangement to connect a suitable voltage from said battery to said vibrator when said vacuum is below a pre-selected level, thereby causing said gas pedal to vibrate under the driver's foot as a signal to the driver that said vacuum is below said level, and to disconnect said voltage to said vibrator when said vacuum is above said level thereby causing said gas pedal to stop vibrating, as a signal to the driver that said vacuum is above said level.

3. The device according to claim 2, wherein said electro-mechanical vibrator comprises (a) at least two electric contacts, at least one being movable, (b) an electro-magnetic coil part and an armature part, at least one of said parts being movable and capable of causing said contacts to make or break electric current flow through said coil part, and (c) a spring disposed to maintain said parts in a position that holds said contacts in normally-closed connection in the absence of sufficient voltage from said battery being applied across said coil part, whereby when said voltage from said battery is applied to said coil part through said contacts being in said normally-closed connection, said coil part generates an electro-magnetic force sufficient to physically displace said movable part and cause said contacts to break said current flow through said coil part, thus allowing said moving part to reverse direction of movement under influence of said spring and cause said contacts to close, and causing this cycle of operation to repeat itself continuously as long as said voltage is applied to the circuit comprising said contacts and said coil part, thereby resulting in an oscillating action of the mass of said movable part that produces a mechanical vibration that is coupled to said gas pedal.

4. The device according to claim 2, wherein said electro-mechanical vibrator comprises (a) an electronic multivibrator circuit of a free-running type capable of producing an alternating output-voltage of a pre-selected frequency, amplitude, and wave form as long as said circuit is connected to said voltage from said battery through said sensing assembly, (b) an electric solenoid having an electro-magnetic coil part and a plunger part, at least one of said parts being movable, and (c) a spring disposed to maintain said parts of said solenoid in a spring-retained position in the absence of said output voltage from said multivibrator circuit being applied across said coil part, whereby when said output-voltage is applied to said coil part from said multivibrator circuit, said coil part generates an alternating electro-magnetic force that, combined with the retaining force of said spring, causes said movable part to alternate in physical position at said frequency of said output-voltage as long as said voltage from said battery is applied to said multivibrator circuit through said sensing assembly, thereby causing an alternating movement of the mass of said movable part producing a mechanical vibration that is coupled to said gas pedal.

5. The device according to claim 2, wherein said electro-mechanical vibrator comprises (a) an electric motor with rotating shaft output and being operable when connected to said voltage through said sensing assembly, and (b) an eccentric member shaft-coupled to said motor and which, when rotated by said motor, produces a mechanical vibration that is coupled to said gas pedal.

6. The device according to any one of claims 2 to 5, wherein said sensing assembly comprises (i) a vacuum operator with an internal vacuum-operated diaphragm which varies in physical position in direct relation to said vacuum as applied, and (ii) an electric switch arrangement which is coupled to said diaphragm, and which is in open position when said vacuum applied to said diaphragm is above said pre-selected level, and which is in closed position when said vacuum is below said level and is then capable of connecting said voltage from said battery to said vibrator.

7. The device according to any one of claims 2 to 5, wherein said sensing assembly comprises (i) a vacuum operator with an internal vacuum-operated piston which varies in physical position in direct relation to said vacuum as applied, and (ii) an electric switch arrangement which is coupled to said piston, and which is in open position when said vacuum applied to said piston is above said pre-selected level, and which is in closed position when said vacuum is below said level and is then capable of connecting said voltage from said battery to said vibrator.

8. The device according to any one of claims 2 to 5, wherein said sensing assembly comprises (i) a vacuum operator with an internal vacuum-operated bellows in which at least one surface of said bellows varies in direct relation to said vacuum as applied, and (ii) an electric switch arrangement which is coupled to said surface of said bellows, and which is in open position when said vacuum applied to said bellows is above said pre-selected level, and which is in closed position when said vacuum is below said level and is then capable of connecting said voltage from said battery to said vibrator.

* * * * *